Sept. 24, 1968  A. D. LEWIS  3,402,947
CONNECTOR
Filed June 20, 1966
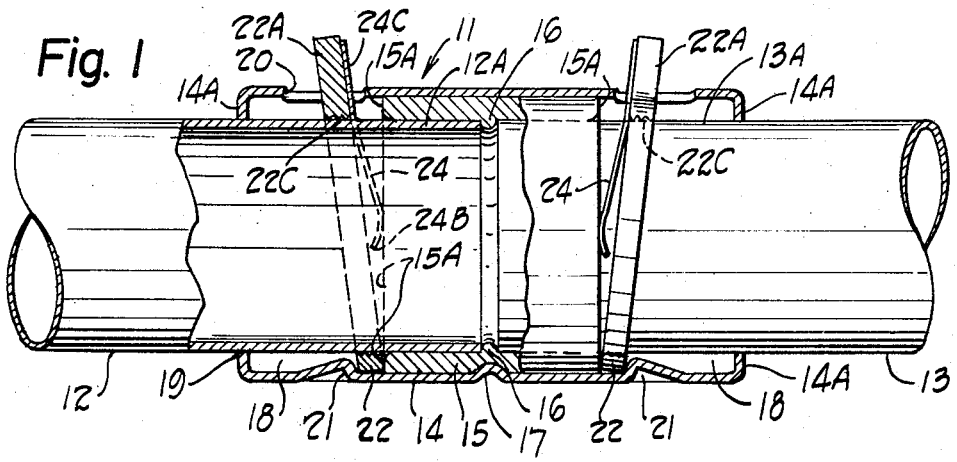
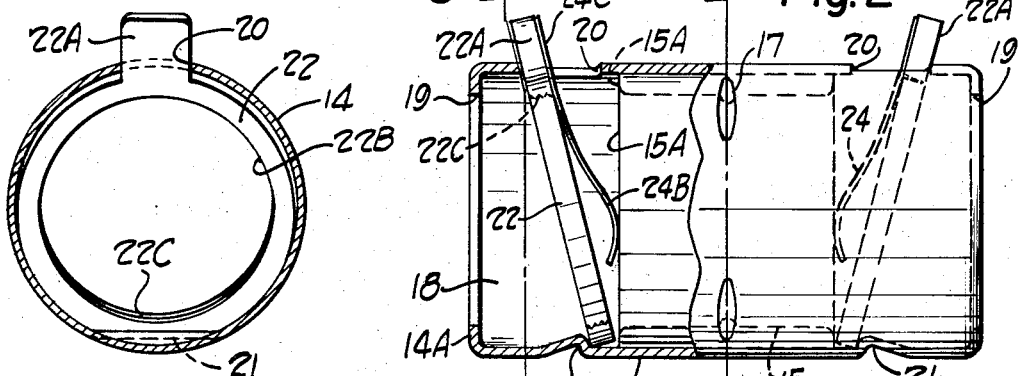
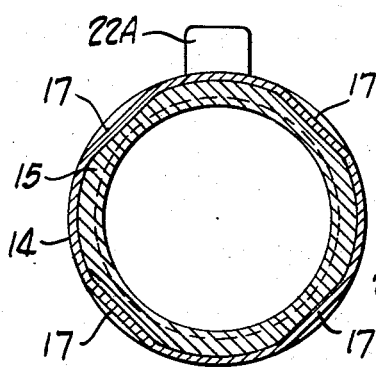
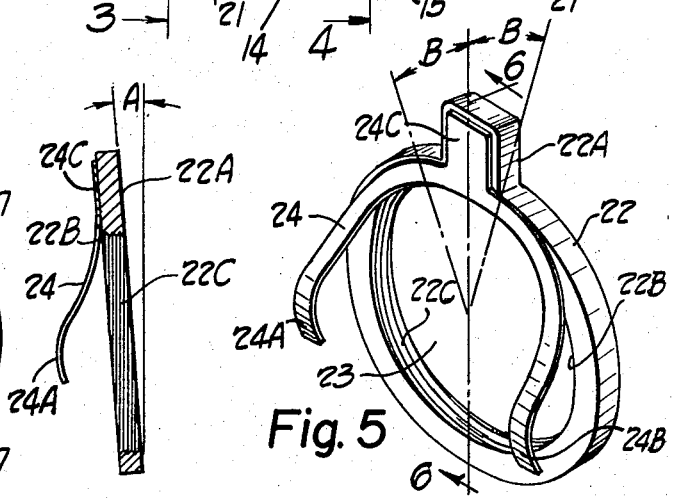
INVENTOR.
ALVAN D. LEWIS
BY
ATTORNEYS.

United States Patent Office 3,402,947
Patented Sept. 24, 1968

3,402,947
CONNECTOR
Alvan D. Lewis, Cleveland, Ohio, assignor of one-half to John A. Donato
Filed June 20, 1966, Ser. No. 558,896
12 Claims. (Cl. 285—317)

ABSTRACT OF THE DISCLOSURE

A connector for tubes and the like, the connector having a cylindrical body, an angularly tiltable plate therein for engaging the tube inserted through an opening in the plate having teeth formed therein for tapping and threadably engaging the tube in the opening upon turning the tube, a shoulder in the body, the body having a longitudinally extending elongated slot, the plate having a projection extending through the slot for guiding tilting action of the plate, the plate being fulcrumed on the shoulder on a side of the bore diametrically opposite of the slot, and a spring member secured to the plate adjacent the projection and having side portions biased away from the plate and extending on both sides of the bore to engage the shoulder at spaced points on opposite sides of the bore to provide a balanced resilient action in urging the plate on the side of the projection away from the shoulder and thus tilt the plate angularly to the axis of the bore, the plate being provided with a plurality of teeth or serially arranged edge portions, the teeth being generated around the axis of the bore upon the plate being in tilted position.

My invention relates to connectors for connecting to a tubular or rod-like member having an outer cylindrical surface.

My invention is directed to a new construction of a connector for connecting a member having a cylindrical outer surface to another like member or to a box or other container into which such members enter and are connected. One important adaptation of the use of my improved device is for connecting electrical tubular conduits together in alignment or connecting such a tubular conduit to a switch box or other container where the wires emerge from the conduit and are there connected to posts or other devices. Heretofore such connectors have usually been cylindrical bodies into which an end of the conduit was inserted and the conduit there secured by set screws abutting the side of the conduit or by other such locking means. These devices usually were such that the tubular conduit was not disposed axially in the bore but was pushed to one side by the set screw or the like. Also the labor involved in making the connection with such prior devices was considerable and sometimes awkwardly performed at the locations where required.

In the use of my improved device, the tubular conduit is manually moved inwardly of the housing and the conduit is there automatically locked by a special locking plate biting into the side of the conduit. In a further refinement, the locking plate may also be provided with threads which bite into and threadably engage with the material, such as metal, of the conduit wall.

An object of my invention is to provide an improved connector which facilitates quick and ready assembly of the conduit and the connector by simple insertion of the conduit axially into the connector body.

Another object is to provide an even greater bite or grasp of the connector body on the conduit by threads which tap or forcibly threadably engage with the outer wall of the conduit.

Another object is the provision for minimizing the required number of operations for connecting tubular conduits or other like bodies having cylindrical surfaces to a connector body which either interconnects to such members in alignment or which connects such a member to a box or other container.

Another object is the provision for an improved and positive grip on the inserted end of a tubular or rod-like member having a cylindrical outer surface upon being inserted axially into the connector body.

Another object is the provision of such a connector which has improved operating characteristics for assembly with tubes, rods and the like, and which is also economical to fabricate and is sturdy in use and operation.

Other objects and a fuller understanding of the invention may be had by referring to the following description and claims, taken in conjunction with the accompanying drawings, in which:

FIGURE 1 is a longitudinal view partially in section showing my improved connector interconnecting two tubular conduits in alignment, and illustrating a typical use of my connector;

FIGURE 2 is a longitudinal view partially in section of my connector and with the tubular conduits removed therefrom;

FIGURE 3 is a cross-sectional view looking through the line 3—3 of FIGURE 2;

FIGURE 4 is a cross-sectional view looking through the line 4—4 of FIGURE 2;

FIGURE 5 is a perspective view of a locking plate constituting a part of my connector; and FIGURE 6 is a longitudinal sectional view taken through the line 6—6 of FIGURE 5.

The connector shown by way of illustration of an embodiment of my invention is a double-ended connector in which two tubes or rod-like members are interconnected in axial alignment with each other. This connector is denoted generally by the reference character 11. This connector 11 has a hollow housing 14 of generally cylindrical form and having a bore 18 extending axially therethrough. At the opposite ends there are ends 19 into which are inserted in axial alignment a tubular or rod-like member 12 at one end and a like tubular or rod-like member 13 at the other end. In the illustrations, the members 12 and 13 are hollow and have their bores interconnecting each other and in axial alignment with each other.

Mounted within the bore of the housing 14 intermediate the opposite ends thereof is a sleeve 15. This sleeve 15 is provided with annular shoulders 15A directed toward the respective opposite ends of the housing 14. The sleeve 15 may be brazed or welded to the inner wall of the housing 14 or it may be held therein by indentations 17 pressing inwardly on the metal of the housing 14 which provides corresponding indentations 17 in the sleeve 15 against axial movement within the housing 14. These indentations 17 have flat-bottomed walls and are four in number equidistantly spaced around the circumference of the housing. These indentations provide convenient flat surfaces for receiving a wrench for imparting rotative movement to the housing or for holding the same against rotative movement.

The sleeve 15 is provided with an annular bead or stop portion 16 extending radially inward which provides a stop or limit to inward movement of the members 12 and 13. The innermost ends of the members 12 and 13 abut against the stop portion 16, thereby being limited against further inward movement into the connector. The inner wall of the sleeve 15 is such as to snugly engage and embrace the inserted end portion of the respective end portions of the respective members 12 and 13. The members 12 and 13 are thus firmly held in axial alignment and truly concentric with the housing 14 with its concentrically mounted sleeve 15.

Mounted within the housing 14 adjacent each of its opposite ends is a locking plate member 22 adapted to interengage with and interlock with a respective member 12 at one end and with a respective member 13 at the other end of the connector. The locking plate member 22 has extending radially outward on one side of the plate member a tab or tongue 22A, which in the illustration of the drawing is on the upper side. Extending through the plate member 22 is a round open space 23 bounded by an annular inside edge portion 22B. This edge portion is of hard metal, considerably harder than the metal of the members 12 and 13. It is formed with sharp edges so as to bite into the softer metal of the cylindrical wall of a member 12 or 13 inserted through the open space 23 upon the plate member 22 being tilted at an acute angle to a plane normal to the axis of the connector and hence to the axis of the tubular members 12 and 13.

Each tab or tongue 22A extends outwardly of the housing 14 through an elongated slot 20 formed in the wall adjacent the opposite ends of the housing 14. Each slot 20 in conjunction with the tab portion 22A provides guiding means for guiding the longitudinal movement of the tab portion 22A and also for resisting rotation of the plate member 22 relative to the housing 14. The tab portion 22A is accessible for manual manipulation so that it may be manually moved longitudinally of the housing between the limits provided by the slot 20.

There is formed in the metal wall of the housing 14 near the bottom portion of each plate member 22 a fulcrum portion 21 which constitutes an internal bulge against which the plate member 22 may pivotally rock, whereby each plate member may swing in an arc between a plane generally normal to the axis of the housing 14 and a plane inclined at an angle to that normal plane. This acute angle is preferably of an order of about 1 to 14 degrees, next preferably of an order of about 1 to 10 degrees, and most preferably of an order of about 3 to 5 degrees, indicated as angle A in FIGURE 6.

Secured to each locking plate member 22 is a leaf spring 24 having the form of a yoke adapted to straddle or embrace a tubular member inserted into the connector. This spring 24 has two side arms 24A and 24B disposed on opposite sides of the connector within the bore of the housing and positioned to bear against an annular shoulder 15A. The ends 24A and 24B are curved or arced as illustrated to provide some sliding engagement with the shoulder 15A during movement of the plate member 22 carrying the spring 24 therewith. The bias of the spring 24B is such as to resiliently urge the plate member to which it is connected toward a tilted position, such as illustrated in FIGURE 2, that is, toward a plane disposed at a said acute angle to a plane normal to the axis of the bore of the connector. The spring 24 has an intermediate portion 24C complementing in general the shape of the tab portion 22A and is secured there to the tab portion 22A by brazing, welding or other suitable means. Thus the spring 24 is secured to the tab portion 22A, but the two spaced side arms 24A and 24B are sprung away from the plane of the plate member and toward the annular shoulder 15A.

The inside edge portion 22B of hardened and preferably heat-treated metal may be provided with threads 22C, whereby the edge portion of the plate member not only tends to bite into the softener metal of the inserted member 12 or 13, but also upon relative rotative movement between the inserted member 12 or 13 and the plate member 22 carried by the housing 14, the threads 22C tend to tap or forcibly interengage with the metal on the outside cylindrical wall of a member 12 or 13.

Thus by means of the special construction shown and described, a tubular member 12, for example, may be axially moved into an open end 19 at one end of the housing 14. Upon meeting the resistance of a tilted plate member 22, it overcomes the resilient bias of spring 24 tending to force the encountered plate member 22 toward a said normal plane, that is, toward the annular shoulder 15A, sufficiently to permit the innermost end of inserted tubular member 12 to abut the stop portion 16 to the position illustrated in FIGURE 1. The resilient bias of the spring 24 is such, however, as to urge the plate member back toward its tilted or angular position and thus to force the sharp hard edge portion 22B into the softer metal of the cylindrical outer wall of member 12. This biting into the wall of the member 12 is particularly pronounced at the upper and lower portions of the edge portion 22B, as seen in FIGURE 1, as the angle of inclination is sharpest at those locations. Any tendency to pull the member 12 outwardly of the housing 14 is resisted by the sharp edge portion 22B biting into the outer cylindrical wall of member 12.

As an added feature and advantage to give even further locking and securement of member 12 within the housing 14, a threaded interengagement may also be provided by the member 12 and plate 22. For example, by rotating the connector housing 14 with a wrench relative to the member 12, the threads 22C making up the inside edge portion 22B tap or forcibly threadably engage with the outer cylindrical wall of member 12. In other words, by providing relative rotative movement by the member 12 and plate member 22, threads are formed in the outer wall of the member 12, which formed threads are threadably interengaged with the hard sharp threads 22C of the edge portion 22B. Only a rotative motion of but a few degrees, such as 5 to 10 degrees, is necessary to provide a good threaded interengagement between the parts.

When it is desired to remove the connector from the tubular conduit, it is merely necessary to reverse the operations by first providing relative rotation between the parts in the opposite direction so as to unscrew the threadably interengaged threads. Then by manually moving the tap portion 22A toward the annular shoulder 15A so as to dispose the plate member 22 generally in said plane normal to the axis of the connector, the edge portion 22B clears the outer cylindrical wall of the member 12 and permits ready withdrawal of the tubular conduit 12 from the connector body. Of course, either the tubular conduit 12 may be rotated or the connector housing may be rotated for such disengagement of the threads, and also either the tubular conduit may be pulled out from the connector or the connector may be pulled off of the end of the conduit in an axial direction.

To provide for quick tapping or threading interengagement of the plate member 22 with a tubular conduit or other like cylindrical member, the threads 22C are formed in the plate member 22 while the plate member 22 is inclined at the acute angle in which it is to be tilted in use, that is, in its position shown in FIGURE 2 prior to the insertion of a tubular conduit therein. In other words, the threads 22C are formed as convolutions around the axis of the bore of the connector body rather than around the axis of the open space 23 in the plate member 22. Also to provide a quicker threaded interengagement of the threads 22C with the cylindrical wall of a member, such as tubular conduit 12, the threads 22C are tapped or formed with the plate member 22 rotated on its axis at about 5 degrees to 20 degrees and most preferably at about 10 degrees from a reference radial line extending from the axis of the plate member 22 out equidistantly between the opposite sides of the tab portion 22A when the plate member is assembled within the connector housing 14. Assuming that the assembled position illustrated in FIGURES 1, 2, 3 and 4 is the normal rotative position of the plate member 22 in the housing 14, then a radial line out through and intermediate the longitudinal edges of the slot 20 would be the reference. The plate member 22 is threaded to form the threads 22C with the plate member 22 rotated at such an angle and out of phase with such normal position when assembled. This provides that the threads are inclined at sharper angles at the top and bottom of the plate member as seen in the drawing, these being the locations where the threads are disposed to first bite into and threadably engage with the tubular conduit when in the position shown in FIGURE 1. By this means, a smaller degree of rotative action is required in order to get a good bite and quick threaded interengagement between the plate member and the cylindrical member inserted therethrough, such as in the position of FIGURE 1. Such degree of rotation is indicated as B in FIGURE 5, such B depending on the direction of rotation and of the threaded operation.

In the assembly and fabrication of my connector, the housing 14 is first formed so that the bore within the housing is straight with end flanges 14A at the opposite ends of the housing conforming to the cylindrical shape of the main body of the housing. In other words, the flanges 14A are not initially formed on the ends of the housing so that the bore of the housing is straight from end to end. Thereafter the sleeve 15 carrying the stop portion 16 is inserted into the housing 14 through one of the open ends thereof and is secured in position by the indentations 17 as described. Thereafter the plate members 22, each carrying a respective spring 24 secured thereto, are moved into the housing 14 from the opposite ends thereof so as to hook the tab portion 22A of each plate member up and through a respective slot 22. This requires the inclination of the plate member while moving the plate member into the housing and manipulating it to the position shown in FIGURE 2 wherein the tab portion 22A protrudes upwardly through a slot 20 and bottom portion of the plate 22 is disposed between a fulcrum portion 21 and the annular shoulder 15A, the spring arms 24A and 24B being disposed to engage the shoulder 15A. After the respective plate members 22 are thus positioned to where shown in FIGURE 2, then the ends of the metal housing are spun or otherwise formed inwardly to provide the end flanges 14A. These flanges 14A prevent the accidental removal of the plate members 22 from the housing 14.

The present disclosure includes that contained in the appended claims, as well as that of the foregoing description.

Although this invention has been described in its preferred form with a certain degree of particularity, it is understood that the present disclosure of the preferred form has been made only by way of example and that numeous changes in the details of construction and the combination and arrangement of parts may be resorted to without departing from the spirit and scope of the invention as hereinafter claimed.

What is claimed is:

1. A connector for tubes, rods or the like having a cylindrical outer wall, said connector comprising in combination a housing having a bore for receiving therein an end portion of a said tube, rod or the like, inserted therein through an open end of said bore, said housing having a stop portion extending inwardly of the bore at an axial distance from that open end for abutting the end of the said tube, rod, or the like inserted into said bore, said housing having an internal shoulder disposed in a plane normal to the axis of said bore facing said open end and surrounding said bore at a location intermediate said open end and said stop portion to encircle a said end portion of a said tube, rod or the like inserted into said housing, an annular plate disposed in said bore intermediate said shoulder and said open end of the housing transversely of the axis of said bore, said plate on one side of said axis having a tab portion extending therefrom, said housing having a slot extending longitudinally of the housing on the side thereof permitting said tab portion to extend outwardly of the housing for movement of the tab portion longitudinally of the housing along said slot, said plate having an open space therein for accommodating therein a said end portion inserted into said bore, said plate having a plurality of concentric axially aligned edge portions bordering said open space formed to bite into the cylindrical wall of said end portion upon said plate being disposed at an acute angle to a plane normal to the bore axis, said open space being dimensioned relative to the said cylindrical wall of said end portion inserted in said bore to permit said edge portions to clear said end portions for permitting the insertion and withdrawal of a said end portion into the bore through said open space upon the plate being disposed substantially in said plane and to permit said edge portions to bite into said cylindrical wall upon said plate being disposed at an acute angle to said plane, and resilient means carried by said housing abutting said shoulder at spaced points on diametrically opposite sides of said bore substantially equidistant from said tab portion and engaging said plate adjacent said tab portion substantially equidistantly from said spaced points, and resiliently urging said plate to tilt at an acute angle to said plane in position for said edge portion to bite into said cylindrical wall of a said end portion extending axially in said bore, said resilient means being secured to said plate to shift laterally therewith of said bore.

2. A connector as claimed in claim 1 and in which said resilient means is positioned to urge the said plate on the side of the said tab portion to tilt toward said open end of the housing.

3. A connector as claimed in claim 1 and including fulcrum means carried by said housing for giving fulcrum support to said plate in tilting relative to said plane.

4. A connector as claimed in claim 1 and in which said resilient means constitutes a metal leaf spring in the form of a yoke having the intermediate portion thereof secured to said plate on the side of said tab portion and having the two side portions thereof extending away from the plane of said plate, said side portions being spaced to be disposed astride a said end portion inserted into said bore and positioned to abut said shoulder for resiliently urging the plate on said side of said tab portion to tilt away from the plane of said shoulder.

5. A connector as claimed in claim 1 and in which the said axially aligned edge portions bordering said open space are in the form of screw threads disposed to threadably engage with a said cylindrical wall at a plurality of axially spaced locations upon the said tilting of the plate at an acute angle to said plane and relative rotative motion between said housing and said cylindrical wall.

6. A connector as claimed in claim 5 and in which said threads are arranged in convolutions about said axis of the bore with said plate tipped at said acute angle to said plane and with said plate rotated on said axis at an acute angle to a reference radial line through said slot to present threads inclined most sharply to said plane at the area of said reference radial line to threadably bite readily into the cylindrical wall of a said inserted end portion in the region of said slot.

7. A connector for a member having a cylindrical outer wall adapted to be bitten into by a sharp hard edge of the connector to resist axial movement of said member relative to said connector, comprising the combination of, a housing having a generally cylindrical bore for telescopically receiving an end portion of said member inserted therein, a sleeve disposed in said housing at a distance from the open end of the bore through which said member is inserted for snugly receiving said inserted end portion, said housing carrying a stop portion integral with said sleeve projecting radially inwardly thereof adapted to engage the innermost end of said inserted end portion to limit the insertion thereof through said sleeve into said housing, said sleeve being spaced from said open end of the bore to provide an annular shoulder disposed in a plane transverse to the axis of said bore, a plate member having an open space therein for accommodating a said end portion inserted into said bore, said plate member being disposed in said housing intermediate said shoulder and said open end, and resilient means carried by said housing resiliently urging said plate member to tilt at an acute angle to a plane normal to the axis of said bore, said resilient means including a central portion secured to said plate at a location on a side of said bore and two side portions directed away from said location and bowed away from the plane of said plate and slidably engaging said shoulder at spaced points on diametrically opposite sides of said bore substantially equidistantly from said location, the said plate member at the border of said open space having at least one sharp hard edge disposed to bite into the cylindrical wall of a said end portion inserted into said bore and through said open space upon said plate being tilted at an acute angle to the axis of said bore, said open space being dimensioned to coincide generally with the external diameter of said inserted end portion to permit said edge portion to clear said cylindrical wall upon the said plate member being disposed substantially in said normal plane for allowing the ready insertion and withdrawal of said end portion through said open space, said plate member having a first guide portion adjacent said location and movable longitudinally of the said housing and protruding therefrom as said plate member is tilted, said housing having a second guide portion including parallel longitudinally extending walls cooperating with said first guide portion for guiding said longitudinal movement between limits determined by the said guide portions, said plate member being movable against the resiliency of the resilient means toward said normal plane to permit said edge portion of the plate member to clear said cylindrical wall of a said end portion in said bore.

8. A connector as claimed in claim 7 and in which said edge portion of the plate member is formed into threads disposed to threadably tap and engage said cylindrical wall of an inserted end portion upon the plate member being tilted to said normal plane to cause the said edge portion to bite into the said cylindrical wall and upon relative rotative movement between said plate member and said inserted end portion.

9. A connector as claimed in claim 8 and in which said threads formed in said edge portion are formed about an axis coinciding with the axis of the said bore with the plate tilted at said acute angle to the said axis, to threadably tap and engage said cylindrical wall of an inserted end portion upon said plate member being tilted at generally said acute angle.

10. A connector as claimed in claim 9 and in which said threads are formed in the edge portion tilted at said acute angle while the plate is rotated on said axis on the order of about 5° to about 20° out of phase from the position it assumes when assembled in said housing to present a faster angle to the threads meeting said cylindrical wall of the inserted end portion at the forwardmost and rearwardmost locations of the bite of said edge portion into the said cylindrical wall longitudinally of the inserted inner end portion.

11. A connector as claimed in claim 7 and in which said resilient means consists of a leaf spring disposed astride said bore to straddle an inserted end portion, having an intermediate portion secured to said plate member adjacent said first guide means, and having similar spaced side portions disposed away from said plate member to engage said sleeve on opposite sides of said bore substantially equidistantly from said intermediate portion to resiliently urge the plate member equally on said opposite sides toward the said open end away from said sleeve, and in which said housing carries fulcrum means providing a bearing support for the plate member for tilting the same by the resilient force of said leaf spring.

12. A connector as claimed in claim 7 and in which said first guide portion of the plate member is a radially extending tab integral therewith at said location and said second guide portion of the housing is a longitudinally extending slot in the wall of the housing and through which said tab is longitudinally movable between limits provided by the slot upon movement of the plate member between tilting and non-tilting angular disposition and in which said side portions of the resilient means are directed laterally away from said tab portion of the plate member.

References Cited
UNITED STATES PATENTS

| 1,203,071 | 10/1916 | Straub | 85—36 |
| 2,360,732 | 10/1944 | Smith | 285—340 |
| 2,781,686 | 2/1957 | Boyd | 85—36 |

FOREIGN PATENTS

| 573,382 | 11/1945 | Great Britain. |

CARL W. TOMLIN, *Primary Examiner.*
R. SKUDY, *Assistant Examiner.*